United States Patent
Perry

(10) Patent No.: US 10,881,125 B1
(45) Date of Patent: Jan. 5, 2021

(54) TAURINE-CONTAINING COMPOSITION FOR IMPROVING ASSIMILATION OF COMPOUNDS CONTAINED IN INGESTIBLE ITEMS

(71) Applicant: Stephen C. Perry, Norwood, MA (US)

(72) Inventor: Stephen C. Perry, Norwood, MA (US)

(\*) Notice: Subject to any disclaimer, the term of this patent is extended or adjusted under 35 U.S.C. 154(b) by 221 days.

(21) Appl. No.: 15/986,515

(22) Filed: May 22, 2018

Related U.S. Application Data

(63) Continuation-in-part of application No. 15/582,007, filed on Apr. 28, 2017, now Pat. No. 10,499,677.

(60) Provisional application No. 62/329,042, filed on Apr. 28, 2016.

(51) Int. Cl.
 *A23L 33/10* (2016.01)

(52) U.S. Cl.
 CPC .......... *A23L 33/10* (2016.08); *A23V 2002/00* (2013.01)

(58) Field of Classification Search
 CPC ........ A23L 33/10; A23L 29/281; A23L 33/17; A23L 33/175
 USPC .................................. 426/615, 648, 654, 656
 See application file for complete search history.

(56) References Cited

U.S. PATENT DOCUMENTS

| | | | |
|---|---|---|---|
| 2003/0091655 A1* | 5/2003 | Cohen | |
| 2012/0258087 A1* | 10/2012 | Jedlinski et al. | |
| 2013/0095125 A1* | 4/2013 | Kneller | |
| 2016/0106695 A1* | 4/2016 | Mahe et al. | |

\* cited by examiner

*Primary Examiner* — Helen F Heggestad
(74) *Attorney, Agent, or Firm* — Johnson & Martin, P.A.; James David Johnson

(57) ABSTRACT

Taurine-containing compositions and methods for producing an extending the release of nutrients or other compounds from an ingested item and for improving assimilation of those nutrients or other compounds by the body during digestion are described. The compositions can be a single food-safe taurine-containing compound or a composition containing two or more food-safe taurine-containing compounds. The taurine-containing composition can include a taurine ester, a taurine salt, a taurine amino alcohol, or a combination of two or more of the foregoing. The compositions can be applied to ingestible items such as foods and nutritional supplements to control the timing of release of nutrients and other compounds during digestion.

16 Claims, No Drawings

TAURINE-CONTAINING COMPOSITION FOR IMPROVING ASSIMILATION OF COMPOUNDS CONTAINED IN INGESTIBLE ITEMS

CROSS-REFERENCE TO RELATED APPLICATIONS

This application is a continuation-in-part nonprovisional application of and claims priority from U.S. nonprovisional patent application Ser. No. 15/582,007, filed on Apr. 28, 2017, which is a nonprovisional of U.S. provisional patent application Ser. No. 62/329,042, filed on Apr. 28, 2016. U.S. nonprovisional patent application Ser. No. 12/717,942, filed on Mar. 4, 2010, is incorporated in its entirety herein by reference. The foregoing applications are incorporated in their entirety herein by reference.

FIELD OF THE INVENTION

The invention relates to compositions and methods that promote health and increase the shelf-life of foods. More particularly, the invention relates to taurine-containing and taurine-derived compositions and methods for using the same to improve health by controlling the timing of digestion of foods and nutraceutical products.

BACKGROUND

Society has become increasingly aware of the importance of maintaining proper nutritional habits. As the average diet increasingly utilizes processed foods, it has become more important for processed foods to provide the same good nutritional benefits of natural foods.

Nutrients necessary to support life include proteins, carbohydrates, fats, minerals, and vitamins. Processed food products are often supplemented by the addition of synthetic nutrients to help replace natural nutrients that may have been rendered inactive or otherwise damaged during processing of the food product. Elevated temperatures during cooking, for example, may damage the natural nutrients that are present in foods. The freeze drying process by which food products are dehydrated also may damage the natural nutrients that are present in foods.

Besides nutrients, other non-nutritive compounds found in, for example, fruits and vegetables may have beneficial effects when consumed. Nutraceuticals, for example, are chemical compounds in foods that may aid in preventing or treating diseases and other medical conditions when consumed even though they are not traditionally recognized to possess nutritive value.

Phytochemicals are chemical compounds in plants that also may aid in preventing or treating diseases and other medical conditions when consumed even though they also are not traditionally recognized to possess nutritive value. Nutraceuticals and phytochemicals, like nutrients, may be damaged by subsequent processing of food products to which they are added.

Heating processes for stabilizing and preserving nutrients, particularly phytochemicals, that involve application of a colloid plant extract selected from vegetable gums, hydroscopic phosphatides, vegetable albumin, and pectin are not entirely satisfactory from the standpoint of maintaining the nutritional value of the original foodstuffs, since a relatively large percentage of the nutritional value still may be lost during subsequent processing.

Conventional nutraceutical and phytochemical food additives are often ineffective in promoting good health and nutrition because they are digested in the stomach, which effectively breaks down the additives into compounds that provide less advantage to the body from a health and nutrition viewpoint. The highly acidic conditions present in the stomach prevent many nutraceutical and phytochemical food additives from reaching the intestines, and particularly the small intestine, where the additives may be absorbed for use by the body to provide a nutritional benefit to the consumer.

What is needed is a composition that stabilizes and protects micronutrients, phytochemicals, nutraceuticals, and other beneficial compounds in food additives and food articles from degradation during processing.

SUMMARY

The invention relates to compositions and methods that promote health and increase the shelf-life of foods. The compositions contain or are derived from taurine or taurine-containing compounds and are useful as a treatment that can be applied to an ingestible item to control the timing of digestion and to increase shelf-life of the ingestible item. In some embodiments, the taurine-containing composition is a single food-safe compound or composition that is, includes, or is derived from taurine. In other embodiments, the taurine-containing composition includes two or more food-safe compounds or compositions that are, include, or are derived from taurine. The taurine-containing composition can be a taurine ester, a taurine salt, a taurine amino alcohol, or a combination of two or more of the foregoing. For example, the taurine-containing composition can be taurine glycinate, taurine oleate, taurine ethanoleate, taurine ethanolamine, or a combination of two or more of the foregoing. These taurine analogs are amphiphilic and water soluble. Taurine and its analogs, such as the taurine-containing compositions above, promote the bioavailability of lipid soluble (i.e., fat soluble) vitamins (e.g., vitamins A, D, E, K, and F) by forming various hydrolysable, water soluble complexes that improve assimilation of the lipid soluble vitamins during digestion. In this way, the taurine-containing compositions produce a "gastroretentive" effect when consumed by delaying or slowing digestion of the ingestible item to extend the release of nutrients the ingestible item contains, thereby improving assimilation of the nutrients. Thus, the taurine-containing compositions described herein do not merely physically protect ingestible items from digestion until more nutrients can be released, but rather, these taurine-containing compositions are active compounds that interact with nutrients like the lipid soluble vitamins to form complexes that are more readily assimilated by a human or other animal's body during digestion.

When compounded with an ingestible item (e.g., a food item, a dietary supplement, etc.), the compositions can act as a protective barrier for micronutrients, phytochemicals, and nutraceuticals, such as may be found in the ingestible item, as the ingestible item is stored and as the ingestible item is being digested. The compositions can stabilize ingestible items during prolonged storage and as ingested ingestible items move through the digestive tract so that nutrients are available for absorption in a consumer's intestines. Methods for using the compositions to extend the release time of an ingestible compound are also described.

Accordingly, the invention features a taurine-containing micelle-forming composition for extending release of a compound. The composition is or includes: a taurine ester, a taurine salt, a taurine amino alcohol, or a combination of two or more of the foregoing.

In another aspect, the invention can feature the taurine ester and taurine salt being or including taurine glycinate, taurine oleate, taurine ethanoleate, or a combination of two or more of the foregoing.

In another aspect, the invention can feature the taurine amino alcohol being or including taurine ethanolamine.

In another aspect, the invention can feature taurine glycinate and taurine oleate.

In another aspect, the invention can feature taurine glycinate and taurine ethanoleate.

In another aspect, the invention can feature taurine glycinate and taurine ethanolamine.

In another aspect, the invention can feature taurine oleate and taurine ethanoleate.

In another aspect, the invention can feature taurine oleate and taurine ethanolamine.

In another aspect, the invention can feature taurine ethanoleate and taurine ethanolamine.

In another aspect, the invention can feature taurine glycinate, taurine oleate, and taurine ethanoleate.

In another aspect, the invention can feature taurine glycinate, taurine oleate, and taurine ethanolamine.

In another aspect, the invention can feature taurine glycinate, taurine ethanoleate, and taurine ethanolamine.

In another aspect, the invention can feature taurine oleate, taurine ethanoleate, and taurine ethanolamine.

The invention also relates to a taurine-containing food additive for treating an ingestible item that includes an ingestible compound to control and enhance absorption of the ingestible compound during digestion. The food additive is or includes: a taurine ester, a taurine salt, a taurine amino alcohol, or a combination of two or more of the foregoing.

In another aspect, the invention can feature the taurine ester and taurine salt being or including: taurine glycinate, taurine oleate, taurine ethanoleate, or a combination of two or more of the foregoing.

In another aspect, the invention can feature the taurine amino alcohol being or including taurine ethanolamine.

In another aspect, the invention can feature the ingestible item being a food or a dietary supplement.

The invention also relates to a method for extending release of an ingestible compound. The method includes the steps of: (a) treating an ingestible item with taurine-containing composition to produce a treated item; and (b) ingesting the treated item.

In another step of the method, the treated item is a food or a dietary supplement, and the treated item is or includes an ingestible compound.

In another step of the method, the taurine-containing composition is or includes a taurine ester, a taurine salt, a taurine amino alcohol, or a combination of two or more of the foregoing.

Unless otherwise defined, all technical terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents and other references mentioned herein are incorporated by reference in their entirety. In the case of conflict, the present specification, including definitions will control.

DETAILED DESCRIPTION

The present invention is best understood by reference to the detailed drawings and description set forth herein.

Embodiments of the invention are discussed below with reference to the drawings; however, those skilled in the art will readily appreciate that the detailed description given herein with respect to these figures is for explanatory purposes as the invention extends beyond these limited embodiments. For example, in light of the teachings of the present invention, those skilled in the art will recognize a multiplicity of alternate and suitable approaches, depending upon the needs of the particular application, to implement the functionality of any given detail described herein beyond the particular implementation choices in the following embodiments described and shown. That is, numerous modifications and variations of the invention may exist that are too numerous to be listed but that all fit within the scope of the invention. Also, singular words should be read as plural and vice versa and masculine as feminine and vice versa, where appropriate, and alternative embodiments do not necessarily imply that the two are mutually exclusive.

The present invention should not be limited to the particular methodology, compounds, materials, manufacturing techniques, uses, and applications, described herein, as these may vary. The terminology used herein is used for the purpose of describing particular embodiments only, and is not intended to limit the scope of the present invention. As used herein and in the appended claims, the singular forms "a," "an," and "the" include the plural reference unless the context clearly dictates otherwise. Thus, for example, a reference to "an element" is a reference to one or more elements and includes equivalents thereof known to those skilled in the art. Similarly, for another example, a reference to "a step" or "a means" may be a reference to one or more steps or means and may include sub-steps and subservient means.

All conjunctions used herein are to be understood in the most inclusive sense possible. Thus, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. Structures described herein are to be understood also to refer to functional equivalents of such structures. Language that may be construed to express approximation should be so understood unless the context clearly dictates otherwise.

Unless otherwise defined, all terms (including technical and scientific terms) are to be given their ordinary and customary meaning to a person of ordinary skill in the art, and are not to be limited to a special or customized meaning unless expressly so defined herein.

Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "having" should be interpreted as "having at least"; the term "includes" should be interpreted as "includes but is not limited to"; the term "example" is used to provide exemplary instances of the item in discussion, not an exhaustive or limiting list thereof; and use of terms like "preferably," "preferred," "desired," "desirable," or "exemplary" and words of similar meaning should not be understood as implying that certain features are critical, essential, or even important to the structure or function of the invention, but instead as merely intended to highlight alternative or additional features that may or may not be utilized in a particular embodiment of the invention.

Those skilled in the art will also understand that if a specific number of an introduced claim recitation is intended, such an intent will be explicitly recited in the claim, and in the absence of such recitation no such intent is present. For example, as an aid to understanding, the appended claims may contain usage of the introductory phrases "at least one" and "one or more" to introduce claim recitations; however, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C" is used, in general, such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.).

All numbers expressing dimensions, quantities of ingredients, reaction conditions, and so forth used in the specification are to be understood as being modified in all instances by the term "about" unless expressly stated otherwise. Accordingly, unless indicated to the contrary, the numerical parameters set forth herein are approximations that may vary depending upon the desired properties sought to be obtained.

The invention provides compositions for treating a food article to preserve nutrients in the food article for enteric absorption. These compositions improve health and nutrition of consumers. These compositions can also be added to a food article to increase the food article's shelf-life.

As used throughout this description, "nutrients" can refer to compounds generally recognized as necessary to support human life. These compounds can include proteins, carbohydrates, fats, minerals, and vitamins. Mineral and vitamins, because they are generally required in much smaller amounts than the other nutrients, may be referred to as "micronutrients."

"Nutraceuticals," as used herein, can refer to non-nutritive compounds that nonetheless may produce beneficial effects, for example medicinal effects, when consumed. Exemplary nutraceuticals include, but are not limited to, phytochemicals, glucosamine, methylsulfonylmethane, chondroitin, ruscus, bromlein, boswellin, carnitine, hydroxycitric acid, chitosan, acetyl-L-carnitine, phosphatidylserine, huperzine-A, S-adenosylmethione, vinceptine, dimethylaminoethanol (DMAE), lecithins, *ginseng*, ashwagandha, ipriflavone, NADH, magnesium malate, and D-ribose. "Nutraceuticals" also include as yet unknown or unidentified compounds that may produce beneficial effects when consumed.

"Phytochemicals," as used herein, can refer to non-nutritive plant chemicals that nonetheless may produce beneficial effects when consumed. For example, some phytochemicals have been implicated as anti-cancer compounds or may possess other medicinal qualities. Exemplary phytochemicals include, but are not limited to, ajoene, allyl sulfides, beta-carotene, butyl phthalide, calcium pectate, capsaicin, carotenoids, catechin hydrate, coumarin, coumesterol, ellagic acid, flavonoids and isoflavones such as quercetin, genistein, gingerols, glycyrrhizin catechins, heliotropin, indoles and glucosinolates, isothiocyanates and thiocyanates, kaempferol, lutein, lycopene, monoterpenes such as limonene, para-coumaric acid, phenols, phthalides, phytic acid, polyacetylenes, quercetin, saponin, silymarin, sulfaforaphane, thiols, and zeaxanthin. "Phytochemicals" also include as yet unknown or unidentified plant chemicals that may produce beneficial effects when consumed.

In one embodiment, the composition can include a fatty acid, an oligosaccharide, and a vegetable gum. The fatty acid can be selected from among: oleic acid, lauric acid, linoleic acid, palmitoleic acid, caprylic acid, capric acid, myristic acid, palmitic acid, margaric acid, margaroleic acid, stearic acid, alpha-linoleic acid, arachidic acid, eicosanic acid, behenic acid, erucic acid, and combinations and mixtures thereof. In an exemplary embodiment, the fatty acid can be oleic acid.

The oligosaccharide of the composition can be selected from among: a fructo-oligosaccharide, a galacto-oligosaccharide, an inulin, and combinations and mixtures thereof. The composition can include one or more inulins, as well as the methods for producing such inulins, such as, for example, those described in U.S. Pat. No. 6,203,797, which is incorporated herein by reference.

The vegetable gum can be selected from among: konjac root extract, gellan, xanthan, carrageenan, and combinations and mixtures thereof. The vegetable gum can also be either a natural vegetable gum, a modified vegetable gum, or combinations and mixtures thereof.

In embodiments in which a natural gum is selected as an ingredient of the composition, the natural vegetable gum can be selected from among: gum arabic, guar gum, agar, carrageenan gum, karaya gum, gum ghatti, locust agar, algin, pectin, xanthan gum, locust bean gum, gum tragacanth, tamarind gum, and combinations and mixtures thereof.

In embodiments in which a modified gum is selected as an ingredient of the composition, the modified gum can be selected from among: a chelated agar; a pectin derivative; low-methoxyl pectin; high-methoxyl pectin; an alginate; a cellulose derivative; microcrystalline cellulose; methylcellulose; sodium carboxymethyl cellulose; carboxymethylcellulose; hydroxypropyl cellulose; hydroxypropyl methyl cellulose; sodium hydroxymethyl cellulose; carboxymethyl locust bean gum; gellan gum; carboxymethyl guar gum; and combinations and mixtures thereof. In an exemplary embodiment, the alginate can be propylene glycol alginate.

In an embodiment of the invention, there is provided a composition for stabilizing and protecting micronutrients, phytochemicals, nutraceuticals, and other beneficial compounds in food additives and food articles. The composition may include vegetable gums, oligosaccharides, and at least one fatty acid. An exemplary use of the composition is to protect micronutrients, phytochemicals, nutraceuticals, and other beneficial compounds in food additives and articles from degradation when subjected to low or high temperatures.

Any applicable vegetable gum may be used in the composition, following the guidelines provided herein. Vegetable gums contemplated for use in the invention include, but are not limited to, the following: gum arabic (acacia gum), guar gum (guar flour), agar (agar-agar), carrageenan gum (alpha, kappa and all other types), karaya gum (sterculia gum, India tragacanth, kadaya gum), gum ghatti, locust agar, algin, pectin, xanthan gum, locust bean gum, gum tragacanth, tamarind gum, and combinations and mixtures thereof. Additionally, modified vegetable gums may be used in accordance with the present invention. Modified vegetable gums contemplated for use in the invention include, but are not limited to, the following: chelated agar; pectin derivatives including both low- and high-methoxyl pectin; alginates such as propylene glycol alginate; cellulose derivatives such as microcrystalline cellulose, methylcellulose, sodium carboxymethyl cellulose, carboxymethylcellulose, hydroxypropyl cellulose, hydroxypropyl methyl cellulose, and sodium hydroxymethyl cellulose; carboxymethyl locust bean gum; gellan gum; carboxymethyl guar gum; and combinations and mixtures thereof.

In one exemplary embodiment, the vegetable gum is gellan gum. Gellan gum is a polysaccharide of repeating tetrasaccharide units. Each tetrasaccharide unit has two glucose residues, one glucuronic acid, and one rhamnose residue. Additionally, the tetrasaccharide units may be substituted with acyl (glyceryl and acetyl) groups at the O-glycosidically-linked esters. Gellan gum is commonly obtained from fermentation of a carbohydrate by the bacteria *Pseudomonas elodea*, although gellan gum obtained from other sources also is applicable in the invention.

In another exemplary embodiment, the vegetable gum is xanthan gum. Xanthan gum is a polysaccharide composed of glucose, mannose, and glucuronic acid and has a backbone similar to the backbone of cellulose but with additional trisaccharide sidechains. Xanthan gum is commonly used in food products to control viscosity because of its hydration and gelling capabilities. Additionally, its relatively good hydration ability at low temperatures may make xanthan gum useful in hindering ice recrystallization in freeze-thaw situations. Xanthan gum is commonly obtained from fermentation of corn sugar by the bacteria *Xanthomonas campestris*, although gellan gum obtained from other sources also is applicable in the invention.

In yet another exemplary embodiment, the vegetable gum is carrageenan gum. "Carrageenan" refers collectively to a group of polysaccharides consisting of long chains of galactose derivatives obtained by alkaline extraction from red seaweed, commonly of the genus *Chondrus, Eucheuma, Gigartina* and *Iridaea*. The three most common carrageenan gums (i.e., κ-carrageenan, t-carrageenan, and k-carrageenan) are commonly used as gels and thickeners in food products.

In a preferred embodiment, the composition can include about 1% to about 50% vegetable gums. In a more preferred embodiment, the composition can include about 1% to about 25% vegetable gums. In a most preferred embodiment, the composition can include about 1% to about 10% by weight vegetable gums.

Any applicable oligosaccharides may be used in the composition, following the guidelines provided herein. Oligosaccharides are short chains of sugar molecules. Common oligosaccharides include fructo-oligosaccharides (FOS), galacto-oligosaccharides (GOS), and inulins. Vegetables are common sources of oligosaccharides, though oligosaccharides obtained from other sources also are contemplated for use in the invention.

In a preferred embodiment, the composition can include about 5% to about 45% by weight oligosaccharides. In a more preferred embodiment, the composition can include about 5% to about 25% by weight oligosaccharides. In a most preferred embodiment, the composition can include about 5% to about 10% by weight oligosaccharides.

Application of the composition to a food additive or food article may act as a protective barrier at the molecular level to increase the temperature resistant qualities of the food additive or article, particularly the temperature resistant qualities of micronutrients, phytochemicals, and nutraceuticals that may be present in the food additive or article. For example, addition of the composition may help a food additive or article to withstand the 150° F. to 180° F. temperature changes commonly associated with the freeze drying process. Food additives and articles treated with the natural composition may experience less degradation of their natural nutritional and extra-nutritional content when cooked or frozen by consumers and manufacturers. Application of the natural composition, therefore, may help to reduce reliance upon synthetic nutritional supplements in processed food products.

In another embodiment, there is provided a process for preparing a food additive.

A food article may be shredded and sanitized. A composition comprising vegetable gums, oligosaccharides, and at least one fatty acid as described herein may be applied to the food article. The food article may be freeze dried and ground into a powder. A stabilizing composition optionally may be applied to the powder. The food additive may be mixed with processed foods to enhance the nutritional and extra-nutritional content of the food.

The food article may be any applicable raw material useful as a food additive, as will be appreciated by one skilled in the art. Raw fruits and vegetables, for example, are contemplated as food articles. Phytochemical-rich foods are preferred food articles. Phytochemical-rich foods include, but are not limited to, tomatoes, broccoli, garlic, Brussels sprouts, cabbage, bok choi, and other cruciferous vegetables. Additionally, fruit such as apples and oranges are useful as food articles. The raw fruits and vegetables preferably may be selected, for example, to ensure freshness and stored at reduced temperatures. The food articles may be shredded to a particle size of about 6.2 mm (0.25 inches). Preferably, the food article may be shredded to a particle size of about 3.2 mm (0.125 inches). If desired, the shredded food articles may be selected by weight.

A mixture of vegetable gums, oligosaccharides, and at least one fatty acid as described herein may be applied to the food article, for example by dusting or spraying. The mixture may help to prevent degradation of nutraceuticals and phytochemicals present in the food article during subsequent processing, for example freeze drying. Preferably, the vegetable gum is selected from gellan, xanthan, carrageenan, and combinations and mixtures thereof. A mixture of about 1% to about 50% by weight vegetable gums, about 5% to about 45% by weight oligosaccharides, and about 1% to about 20% by weight fatty acid is preferred. A mixture of about 1% to about 25% by weight vegetable gums, about 5% to about 25% by weight oligosaccharides, and about 5% to about 15% by weight fatty acid is more preferred. A mixture of about 1% to about 10% by weight vegetable gums, about 5% to about 10% by weight oligosaccharides, and about 5% to about 10% by weight fatty acid is most preferred. The mixture may be applied in a liquid form or a dry powdered form. It may be preferable to apply the mixture in a temperature controlled manner so as to maximize the adhesion between the mixture and the food article. Also, it may be preferable to mix the vegetable gum and oligosaccharide components first, thereby forming a sticky product, and then add the fatty acid to the sticky product and mix until homogenous.

The food article may be freeze dried to reduce the moisture content of the article. Freeze drying may proceed in any applicable manner, as will be appreciated by one skilled in the art. In an exemplary embodiment, the food article may be cooled to about 0° C. (32° F.) before being introduced to a rotary type freeze dryer. After introduction of the food article, the pressure in the freeze dryer may be reduced to about 500 microns of Hg (0.5 torr), which may aid in removing moisture from the food article. The evaporation of water from the food article due to the low pressure in the freeze dryer may further reduce the temperature of the food article, for example, to about −18° C. (0° F.). The low pressure may be maintained for about 8 to about 12 hours. Thereafter, the temperature of the freeze dryer may be allowed to increase to about 30° C. (86° F.). Freeze drying the food article may preferably reduce the moisture content, which is typically about 85% before freeze drying, to within the range of about 2% to about 5%.

The food article may be ground to a powder. Preferably, the size of the powder is about 60 mesh to about 100 mesh. The mesh size of the powder may be determined by sifting the powder through a screen with appropriately sized orifices. A sifting process also may be used to separate powders of different sizes in order to obtain a powder of a desired mesh size. A stabilizing composition may optionally be added to the food article. The stabilizing composition, if used, may help to further prevent degradation of micronutrients, nutraceuticals, and phytochemicals present in the food article during subsequent processes, for example cooking. In a preferred embodiment, a stabilizing composition comprising a second mixture of vegetable gums, oligosaccharides, and at least one fatty acid as described herein is added to the food article.

The food additives made according to this process may exhibit superior resistance to degradation and deactivation of constituent nutraceuticals, phytochemicals, and micronutrients during subsequent processing of food products supplemented with the food additives. For example, the phytochemicals of the food additives made according to this process may resist temperatures up to about 80° C. (180° F.). More preferably, food additives made according to this process may maintain 97% of their natural nutritional content at temperatures up to 205° C. (400° F.).

The invention now will be described in more detail with reference to the following non-limiting example.

Example 1

Tests were conducted using the composition which determined that vegetable gums containing polysaccharides such as, for example, oligosaccharides, are preferred for inclusion in the composition over saccharides such as, for example, lactose. In these tests, sodium ascorbate, a freely water-soluble compound, was used as a detectable marker. Microcrystalline cellulose ("MCC") and waxy cornstarch were used as the excipients in a first set of tablets. In a second set of tablets, lactose monohydrate was used as a reference cofiller instead of the waxy cornstarch. Lactose is the primary saccharide complex found in whey protein materials. Purified water was used as a granulation liquid in these tests.

Preparation of Tablets

As ingredients, the first set of tablets contained: 0.1% sodium ascorbate; 70.6% microcrystalline cellulose; and 29.3% waxy cornstarch. The second set of tablets contained: 0.1% sodium ascorbate; 70.6% microcrystalline cellulose; and 29.3% lactose.

Each set of tablets was made using the extrusion/spheronization technique using a mixer/granulator, an extruder, and a spheronizer. The tablets were prepared in batches of 2.5 kg. The speed of the powder feeder was 35 rpm and the speed of the liquid input pump was 195 rpm for formulation I (i.e., the first set of tablets) and 158 rpm for formulation II (i.e., the second set of tablets). The spheronization times for formulations I and II were 6 minutes and 2 minutes, respectively. The tablets were dried for 24 hours at ambient temperature.

Dissolution Tests

In vitro release tests were performed using a USP (U.S.A. Pharmacopoeia, 1995) apparatus I (basket method). The dissolution medium was 500 mL of 0.1 N hydrochloride acid and simulated intestinal fluid (SIF) without enzyme (pH 7.4, USP) maintained at 37±0.5° C. The basket rotation speed was maintained at 100 rpm. Samples were assayed by UV spectrophotometry at 444 nm for sodium ascorbate.

Confocal Laser Scanning Microscopy (CLSM) and Image Analysis

Observations were made with a Bio-Rad Lasersharp MRC-1024 attached to a microscope using a Zeiss Plan-Neofluar 10×/0.30 NA air lens. A 488-nm line of a krypton-argon laser and a laser power of 0.15 mW were used. The iris, black, gain control, and all other settings were kept constant during all experiments. Kalman for N=6 frames per Z level was set prior to initiation of Z series. Images were recorded at intervals of 5 µm in the Z direction.

Each set of photographs was evaluated using an image analysis system. The image was measured by determination of fluorescence intensity of sodium ascorbate in the film. The measurements were made in triplicate. Exactly the same size of image was determined for images at different sections.

Results of the Dissolution Test

To investigate the enteric properties of the tablets, a dissolution test was performed in 0.1 N HCl for 1 hour, and subsequently in SIF. The results showed that the 29.3% treated waxy cornstarch tablets had a good acidic resistance in 0.1 N HCl solution for at least 1 hour, while the lactose tablets failed the test. The waxy cornstarch-containing enteric tablets dissolved in SIF in less than 10 minutes. The lactose pellets gave no acidic resistance. As regards tablet performance, waxy cornstarch-containing tablets released the marker material slower than the lactose pellets.

Conclusion

Clear differences were found in dissolution between the waxy cornstarch- and lactose-containing tablets. Waxy cornstarch contains almost entirely the polysaccharide amylopectin, with no amylose. Amylopectin is a branched D-glucose (alpha 1-6) chain. This chain also contains alpha 1-4, 1 of the 2 polysaccharides that make up a starch. The branched structure of waxy cornstarch with all its attached chains yielded a large molecule and gave steric hindrance. Obviously, this large branched molecule of waxy cornstarch is able to better control premature sodium ascorbate release from the tablets than when lactose is used as a cofiller (lactose is additionally more water soluble than waxy cornstarch).

Lactose is a disaccharide that consists of galactose and glucose fragments bonded through a β-1→4 glycosidic linkage. Lactose's systematic name is β-D-galactopyranosyl-(1→4)-D-glucose. The reasons mentioned above explain why lactose-containing tablets dissolved faster and, consequently, were poorer candidates for than the waxy cornstarch tablets.

One goal of the compositions and methods described herein is to provide a safe and effective treatment that can be applied to food particles to provide a combination of nutritional stability, preservation of nutritional value, and material transportation to the proper assimilation point in the digestive system of a mammal, and particularly, the digestive system of a human. The use of electrostatically charged coacervates can provide a novel means of delivery and stability. The composition can include mucoadhesive coacervate microparticles capable of delivering viable nutrients, drugs, or other therapeutic or functional agents into the gut for an extended period of time while maintaining high activity potential of such agents throughout their shelf-life and during gastrointestinal transit.

Coacervates form spontaneously when a disordered polypeptide reacts with another biologically derived polyelectrolyte. These coacervates provide a locally segregated environment and also form boundaries that allow the selective absorption of simple organic molecules from the surrounding medium. Similar in loading characteristics to a liposome, such coacervates can be a complex mix of a carbohydrate solution with a protein solution. A truly unique characteristic of these coacervates is their ability to alter shape, merge, divide, form "vacuoles" (which are essentially enclosed compartments filled with inorganic or organic molecules in solution, that in certain cases, can contain solids which have been entrapped within the same vacuole), and release said "vacuole contents," as well as to show other life-resembling properties.

Through the process of deacetylation, alkali-washed chitin, which is a natural biopolymer, becomes the compound chitosan, which produces a previously unknown electrostatic layer on dietary fats, oils, and fatty acid compounds. This formation of non-covalent electrostatic complexes between proteins and polysaccharides enables developing new and novel microstructures depending on the initial environmental conditions, the intrinsic properties of the coacervates to be formed, as well as the application of any physical considerations. These microstructures can be formed in a precursor bulk phase or in the coacervate phase itself, depending on the total target concentration of the biopolymers, leading to novel and desired rheological properties.

Introduction of another phase in the aqueous complex system could also lead to additional oil/water interfacial properties due to the protein-polysaccharide complexation synergistic effects.

Where conventional selections of fatty acids and carbohydrates depended on certain physio-mechanical characteristics, the compositions described herein rely upon their ability to hold and maintain an electric charge, taking full advantage of the electrolytic ability of the biologically derived polypeptides and polyelectrolytes.

The proteins of choice can be plant-derived albumins. Higher molecular weight globular proteins, which can cause allergic reactions if they bind to human IgE antibodies, can be avoided for use in the various embodiments of this composition. Some exemplary sources of protein are hemp, pea, rice, and cranberry seed, with hemp protein being the most preferred. Using plant-derived proteins provides an advantage for use by persons who are vegetarian or vegan and for those who cannot eat meat-derived products for medical reasons. In an alternative embodiment, egg white protein may also be used in the composition but not for embodiments that are to be consumed by strict vegetarians, vegans, and persons who cannot consume certain animal or meat products for medical reasons.

The invention also relates to taurine-containing and taurine-derived compositions and methods that promote health by increasing or promoting uptake or assimilation of nutrients contained by ingestible items. The compositions contain or are derived from taurine (or tauric acid) or taurine-containing compounds (such as taurine analogs or taurine derivatives) and are useful as a treatment that can be applied to an ingestible item to control the timing of digestion and to increase shelf-life of the ingestible item. For convenience and without limiting the scope of the foregoing description, as used herein, the term "taurine-containing composition" refers to compositions of the invention that are or include taurine, one or more compounds that contain taurine, or one or more taurine derivatives. The ingestible item can be a food, a nutraceutical composition, a nutritional supplement (also called a dietary supplement herein), or a pharmaceutical composition. In some embodiments, the taurine-containing composition is a single food-safe compound or composition that is, includes, or is derived from taurine. In other embodiments, the taurine-containing composition includes two or more food-safe compounds or compositions that are, include, or are derived from taurine. The taurine-containing composition can be a taurine ester, a taurine salt, a taurine amino alcohol, or a combination of two or more of the foregoing. For example, the taurine-containing composition can be a taurine analog such as taurine glycinate (also known as glyceryl taurinate), taurine oleate (which is an estolide), taurine ethanoleate, taurine ethanolamine, or a combination of two or more of the foregoing. These taurine analogs are amphiphilic and water soluble. Taurine and its analogs, such as the taurine-containing compositions above, promote the bioavailability of lipid soluble vitamins (e.g., vitamins A, D, E, K, and F) by forming various hydrolysable, water soluble complexes that improve assimilation of the lipid soluble vitamins during digestion. In this way, the taurine-containing compositions produce a "gastroretentive" effect when consumed by delaying or slowing digestion of the ingestible item to extend the release of nutrients the ingestible item contains, thereby improving assimilation of the nutrients. Thus, the taurine-containing compositions described herein do not merely physically protect ingestible items from digestion until more nutrients can be released, but rather, these taurine-containing compositions are active compounds that interact with nutrients like the lipid soluble vitamins to form complexes that are more readily assimilated by a human or other animal's body during digestion.

Because the taurine analogs of the taurine-containing compositions are amphiphilic, they are useful for suspension and colloidal dispersion of lipids in aqueous solutions because they have the ability to solubilize lipids in micelles. When the taurine-containing compositions solubilize lipids in micelles, the lipid tail of the lipid faces inward within each micelle and the acid end of the lipid interacts with the surrounding aqueous solution.

The taurine-containing compositions can form lipid matrixes with polymers that have the ability to "swell" or expand when exposed to acidic conditions (such as in the human digestive tract), which provides a mechanism for sustained release of vitamins and other nutrients as well as pharmaceutical compounds during digestion from consumed ingestible items to which one of the taurine-containing compositions was applied prior to consumption.

The taurine-containing composition is applied to the ingestible item for treatment before the ingestible item is consumed by a human or other animal. The ingestible item may be processed before application of the composition to it. For example, the ingestible item may be cut, diced, chopped, shredded, crushed, blended, mixed, powderized, atomized, reduced to particle or particulate size, placed in suspension, dispersed in a colloid, dissolved in a solution, liquefied, torn into pieces, cooked, heated, cooled, chilled, frozen, or otherwise processed so as to cause some physical and/or chemical change to the ingestible item. The ingestible item may be combined with other ingestible items before or after it is processed and such combination can occur before or after application of the taurine-containing composition. In exemplary embodiments, the taurine-containing composition is applied to a processed ingestible item that has been processed in one or more of the processing manners described above. In the most preferred embodiments, the ingestible item is reduced to particle size and then placed in suspension or in a colloid with the taurine-containing composition. For example, ingestible item that is reduced to particle size can be one or more raw fruits, one or more raw vegetables, or one or more raw fruits plus one or more raw vegetables, which are added to (or to which are added) the taurine-containing composition. In other embodiments, the taurine-containing composition may be applied to a raw ingestible item, i.e., one that has not been processed in any of the processing manners described above.

When the taurine-containing composition is applied to a processed ingestible item that is in suspension or in a colloid (e.g. food particles in suspension or food particles in a colloid), the suspended particles become part of micelles that are formed by the ingestible item being reduced to particle size and placed in (or made part of) the suspension or colloid. The micelles formed by the combination of the taurine-containing composition and the ingestible item placed in suspension or in a colloid allow for a controlled or sustained release of vitamins, minerals, or other nutrients or of pharmaceutical compounds contained by the particles of the ingestible item in the micelles.

Once the ingestible item is treated with the taurine-containing composition, in exemplary embodiments, the taurine-containing composition is about 2 to about 20 percent weight of the total weight of the combination of the ingestible item treated with the composition. In the most preferred embodiments, the taurine-containing composition is about 5 to about 8 percent weight of the total weight of the ingestible item treated with the composition.

In one embodiment, the taurine-containing composition is taurine glycinate only and does not contain any other ingredients.

In another embodiment, the taurine-containing composition is taurine glycinate and also contains one or more other taurine-containing compounds, e.g., one or more of the taurine analogs described herein. In such embodiments, the composition may contain taurine glycinate and one or more other taurine-containing compounds plus one or more other ingredients that do not contain taurine. Examples of such ingredients that do not contain taurine include the other compounds disclosed herein. In alternate embodiments, the composition may contain taurine glycinate and one or more other taurine-containing compounds but excludes any other ingredients that do not contain taurine.

In another embodiment, the taurine-containing composition is taurine glycinate and also contains one or more other ingredients that do not contain taurine but excludes any other taurine-containing compounds. Examples of such ingredients that do not contain taurine include the other compounds disclosed herein.

In one embodiment, the taurine-containing composition is taurine oleate only and does not contain any other ingredients.

In another embodiment, the taurine-containing composition is taurine oleate and also contains one or more other taurine-containing compounds, e.g., one or more of the taurine analogs described herein. In such embodiments, the composition may contain taurine oleate and one or more other taurine-containing compounds plus one or more other ingredients that do not contain taurine. Examples of such ingredients that do not contain taurine include the other compounds disclosed herein. In alternate embodiments, the composition may contain taurine oleate and one or more other taurine-containing compounds but excludes any other ingredients that do not contain taurine.

In another embodiment, the taurine-containing composition is taurine oleate and also contains one or more other ingredients that do not contain taurine but excludes any other taurine-containing compounds. Examples of such ingredients that do not contain taurine include the other compounds disclosed herein.

In one embodiment, the taurine-containing composition is taurine ethanoleate only and does not contain any other ingredients.

In another embodiment, the taurine-containing composition is taurine ethanoleate and also contains one or more other taurine-containing compounds, e.g., one or more of the taurine analogs described herein. In such embodiments, the composition may contain taurine ethanoleate and one or more other taurine-containing compounds plus one or more other ingredients that do not contain taurine. Examples of such ingredients that do not contain taurine include the other compounds disclosed herein. In alternate embodiments, the composition may contain taurine ethanoleate and one or more other taurine-containing compounds but excludes any other ingredients that do not contain taurine.

In another embodiment, the taurine-containing composition is taurine ethanoleate and also contains one or more other ingredients that do not contain taurine but excludes any other taurine-containing compounds. Examples of such ingredients that do not contain taurine include the other compounds disclosed herein.

In one embodiment, the taurine-containing composition is taurine ethanolamine only and does not contain any other ingredients.

In another embodiment, the taurine-containing composition is taurine ethanolamine and also contains one or more other taurine-containing compounds, e.g., one or more of the taurine analogs described herein. In such embodiments, the composition may contain taurine ethanolamine and one or more other taurine-containing compounds plus one or more other ingredients that do not contain taurine. Examples of such ingredients that do not contain taurine include the other compounds disclosed herein. In alternate embodiments, the composition may contain taurine ethanolamine and one or more other taurine-containing compounds but excludes any other ingredients that do not contain taurine.

In another embodiment, the taurine-containing composition is taurine ethanolamine and also contains one or more other ingredients that do not contain taurine but excludes any other taurine-containing compounds. Examples of such ingredients that do not contain taurine include the other compounds disclosed herein.

In one embodiment, the taurine-containing composition contains taurine glycinate and taurine oleate only. In another embodiment, the taurine-containing composition contains only taurine glycinate, taurine oleate, and one or more other taurine-containing compounds. In yet another embodiment, the taurine-containing composition contains taurine glycinate, taurine oleate, one or more other taurine-containing compounds, and one or more ingredients that do not contain taurine. In still another embodiment, the taurine-containing composition contains only taurine glycinate, taurine oleate, and one or more other compounds that do not contain taurine. Examples of such ingredients that do not contain taurine include the other compounds disclosed herein.

In one embodiment, the taurine-containing composition contains taurine glycinate and taurine ethanoleate only. In another embodiment, the taurine-containing composition contains only taurine glycinate, taurine ethanoleate, and one or more other taurine-containing compounds. In yet another embodiment, the taurine-containing composition contains taurine glycinate, taurine ethanoleate, one or more other taurine-containing compounds, and one or more ingredients that do not contain taurine. In still another embodiment, the taurine-containing composition contains only taurine glycinate, taurine ethanoleate, and one or more other compounds that do not contain taurine. Examples of such ingredients that do not contain taurine include the other compounds disclosed herein.

In one embodiment, the taurine-containing composition contains taurine glycinate and taurine ethanolamine only. In another embodiment, the taurine-containing composition contains only taurine glycinate, taurine ethanolamine, and one or more other taurine-containing compounds. In yet another embodiment, the taurine-containing composition contains taurine glycinate, taurine ethanolamine, one or more other taurine-containing compounds, and one or more ingredients that do not contain taurine. In still another embodiment, the taurine-containing composition contains only taurine glycinate, taurine ethanolamine, and one or more other compounds that do not contain taurine. Examples of such ingredients that do not contain taurine include the other compounds disclosed herein.

In one embodiment, the taurine-containing composition contains taurine oleate and taurine ethanoleate only. In another embodiment, the taurine-containing composition contains only taurine oleate, taurine ethanoleate, and one or more other taurine-containing compounds. In yet another embodiment, the taurine-containing composition contains taurine oleate, taurine ethanoleate, one or more other taurine-containing compounds, and one or more ingredients that do not contain taurine. In still another embodiment, the taurine-containing composition contains only taurine oleate, taurine ethanoleate, and one or more other compounds that do not contain taurine. Examples of such ingredients that do not contain taurine include the other compounds disclosed herein.

In one embodiment, the taurine-containing composition contains taurine oleate and taurine ethanolamine only. In another embodiment, the taurine-containing composition contains only taurine oleate, taurine ethanolamine, and one or more other taurine-containing compounds. In yet another embodiment, the taurine-containing composition contains taurine oleate, taurine ethanolamine, one or more other taurine-containing compounds, and one or more ingredients that do not contain taurine. In still another embodiment, the taurine-containing composition contains only taurine oleate, taurine ethanolamine, and one or more other compounds that do not contain taurine. Examples of such ingredients that do not contain taurine include the other compounds disclosed herein.

In one embodiment, the taurine-containing composition contains taurine ethanoleate and taurine ethanolamine only. In another embodiment, the taurine-containing composition contains only taurine ethanoleate, taurine ethanolamine, and one or more other taurine-containing compounds. In yet another embodiment, the taurine-containing composition contains taurine ethanoleate, taurine ethanolamine, one or more other taurine-containing compounds, and one or more ingredients that do not contain taurine. In still another embodiment, the taurine-containing composition contains only taurine ethanoleate, taurine ethanolamine, and one or more other compounds that do not contain taurine. Examples of such ingredients that do not contain taurine include the other compounds disclosed herein.

In one embodiment, the taurine-containing composition contains taurine glycinate, taurine oleate, and taurine ethanoleate only. In another embodiment, the taurine-containing composition contains only taurine glycinate, taurine oleate, taurine ethanoleate, and one or more other taurine-containing compounds. In yet another embodiment, the taurine-containing composition contains taurine glycinate, taurine oleate, taurine ethanoleate, one or more other taurine-containing compounds, and one or more ingredients that do not contain taurine. In still another embodiment, the taurine-containing composition contains only taurine glycinate, taurine oleate, taurine ethanoleate, and one or more other compounds that do not contain taurine. Examples of such ingredients that do not contain taurine include the other compounds disclosed herein.

In one embodiment, the taurine-containing composition contains taurine glycinate, taurine oleate, and taurine ethanolamine only. In another embodiment, the taurine-containing composition contains only taurine glycinate, taurine oleate, taurine ethanolamine, and one or more other taurine-containing compounds. In yet another embodiment, the taurine-containing composition contains taurine glycinate, taurine oleate, taurine ethanolamine, one or more other taurine-containing compounds, and one or more ingredients that do not contain taurine. In still another embodiment, the taurine-containing composition contains only taurine glycinate, taurine oleate, taurine ethanolamine, and one or more other compounds that do not contain taurine. Examples of such ingredients that do not contain taurine include the other compounds disclosed herein.

In one embodiment, the taurine-containing composition contains taurine glycinate, taurine ethanoleate, and taurine ethanolamine only. In another embodiment, the taurine-containing composition contains only taurine glycinate, taurine ethanoleate, taurine ethanolamine, and one or more other taurine-containing compounds. In yet another embodiment, the taurine-containing composition contains taurine glycinate, taurine ethanoleate, taurine ethanolamine, one or more other taurine-containing compounds, and one or more ingredients that do not contain taurine. In still another embodiment, the taurine-containing composition contains only taurine glycinate, taurine ethanoleate, taurine ethanolamine, and one or more other compounds that do not contain taurine. Examples of such ingredients that do not contain taurine include the other compounds disclosed herein.

In one embodiment, the taurine-containing composition contains taurine oleate, taurine ethanoleate, and taurine ethanolamine only. In another embodiment, the taurine-containing composition contains only taurine oleate, taurine ethanoleate, taurine ethanolamine, and one or more other taurine-containing compounds. In yet another embodiment, the taurine-containing composition contains taurine oleate, taurine ethanoleate, taurine ethanolamine, one or more other taurine-containing compounds, and one or more ingredients that do not contain taurine. In still another embodiment, the taurine-containing composition contains only taurine oleate, taurine ethanoleate, taurine ethanolamine, and one or more other compounds that do not contain taurine.

Examples of such ingredients that do not contain taurine include the other compounds disclosed herein.

In the foregoing embodiments, where an embodiment is described as including "only" certain specific, identified ingredients, such embodiment of the taurine-containing composition excludes any other ingredients not identified.

In addition to one or more of the taurine analogs above, in some embodiments, the composition also includes one or more fatty acids such as those described elsewhere herein. In exemplary embodiments containing fatty acids, the fatty acids can be 12-20 carbon molecule fatty acids.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A taurine-containing micelle-forming composition for extending release of a compound, the composition comprising: taurine glycinate, taurine oleate, taurine ethanoleate, taurine ethanolamine, or a combination of two or more of the foregoing; wherein the composition forms micelles.

2. The composition of claim 1, comprising taurine glycinate and taurine oleate.

3. The composition of claim 1, comprising taurine glycinate and taurine ethanoleate.

4. The composition of claim 1, comprising taurine glycinate and taurine ethanolamine.

5. The composition of claim 1, comprising taurine oleate and taurine ethanoleate.

6. The composition of claim 1, comprising taurine oleate and taurine ethanolamine.

7. The composition of claim 1, comprising taurine ethanoleate and taurine ethanolamine.

8. The composition of claim 1, comprising taurine glycinate, taurine oleate, and taurine ethanoleate.

9. The composition of claim 1, comprising taurine glycinate, taurine oleate, and taurine ethanolamine.

10. The composition of claim 1, comprising taurine glycinate, taurine ethanoleate, and taurine ethanolamine.

11. The composition of claim 1, comprising taurine oleate, taurine ethanoleate, and taurine ethanolamine.

12. A taurine-containing food additive for treating an ingestible item comprising an ingestible compound to control and enhance absorption of the ingestible compound during digestion, the food additive comprising: taurine glycinate, taurine oleate, taurine ethanoleate, taurine ethanolamine, or a combination of two or more of the foregoing; wherein the composition forms micelles.

13. The composition of claim 12, wherein the ingestible item is a food or a dietary supplement.

14. A method for extending release of an ingestible compound, the method comprising the steps of:
   (a) treating an ingestible item with taurine-containing composition to produce a treated item; wherein the taurine-containing composition forms micelles; and
   (b) ingesting the treated item for extended release of the ingestible item during digestion.

15. The method of claim 14, wherein the treated item is a food or a dietary supplement, and wherein the treated item comprises an ingestible compound.

16. The method of claim 14, wherein the taurine-containing composition comprises taurine glycinate, taurine oleate, taurine ethanoleate, taurine ethanolamine, or a combination of two or more of the foregoing.

* * * * *